US010093242B2

(12) United States Patent
Will et al.

(10) Patent No.: US 10,093,242 B2
(45) Date of Patent: Oct. 9, 2018

(54) VEHICLE MOUNTABLE CARRIER SYSTEM

(71) Applicants: Brian Will, Tallahassee, FL (US); Ken Kniepmann, Tallahassee, FL (US)

(72) Inventors: Brian Will, Tallahassee, FL (US); Ken Kniepmann, Tallahassee, FL (US)

(*) Notice: Subject to any disclaimer, the term of this patent is extended or adjusted under 35 U.S.C. 154(b) by 10 days.

(21) Appl. No.: 15/669,288

(22) Filed: Aug. 4, 2017

(65) Prior Publication Data
US 2017/0334360 A1 Nov. 23, 2017

Related U.S. Application Data

(63) Continuation of application No. 14/207,406, filed on Mar. 12, 2014, now Pat. No. 9,855,897.

(51) Int. Cl.
B60R 9/02 (2006.01)
B60R 11/00 (2006.01)

(52) U.S. Cl.
CPC ............. B60R 9/02 (2013.01); B60R 11/00 (2013.01); B60R 2011/004 (2013.01); B60R 2011/0056 (2013.01); B60R 2011/0059 (2013.01)

(58) Field of Classification Search
CPC ............... B60R 9/02; B60R 2011/0056
USPC ....... 224/559, 546–547, 553, 560, 564, 543, 224/572, 927; 248/206.2, 220.21, 222.52, 248/224.8, 223.21, 225.21
See application file for complete search history.

(56) References Cited

U.S. PATENT DOCUMENTS

| | | | |
|---|---|---|---|
| 1,919,271 A * | 7/1933 | Cady .................. | B60R 9/02 224/546 |
| 2,157,001 A | 5/1939 | Morely | |
| D128,287 S * | 7/1941 | Lauronen ............. | 224/482 |
| 2,302,300 A | 11/1942 | Davies | |
| 2,488,263 A | 11/1949 | Bisham | |
| 2,500,881 A | 3/1950 | Stader | |
| 2,549,391 A * | 4/1951 | Secord ................. | B60R 7/10 211/106 |
| 2,558,911 A * | 7/1951 | Penn ................... | B60R 7/10 224/482 |
| 2,596,860 A | 5/1952 | McCrory | |
| 2,764,331 A | 9/1956 | Bigos | |
| 3,776,437 A | 12/1973 | Carney | |
| 3,823,857 A | 7/1974 | Yandt | |
| 4,077,554 A * | 3/1978 | Goode ................. | B60R 9/12 211/70.5 |
| 4,223,862 A * | 9/1980 | Doughty ............. | A61B 6/04 211/105.1 |
| 4,231,501 A | 11/1980 | Goode | |
| 4,576,320 A * | 3/1986 | Mead .................. | B60R 7/082 224/311 |

(Continued)

Primary Examiner — Justin Larson

(57) ABSTRACT

In one series of embodiments, a carrier system includes a rack mountable on a vehicle to transport material. The rack includes a frame having one or more suction cups attached to the rear side of the frame, e.g., for attachment to a surface such as the side of the vehicle. A support bar mates with the frame. The support bar and the frame may include attachment configurations which mate with one another to selectively and securely attach the bar to the front side of the frame with the bar extending in a direction away from the one or more cups. With the rack comprising a plurality of suction cups, the frame may be configured as a plate or may comprise a series of arms or connected braces which extend away from a center position to the suction cups.

15 Claims, 4 Drawing Sheets

(56) References Cited

U.S. PATENT DOCUMENTS

| | | | |
|---|---|---|---|
| 4,607,773 A * | 8/1986 | Mason | B60R 9/02 |
| | | | 224/546 |
| 4,691,851 A | 9/1987 | Aaserude | |
| 4,722,465 A | 2/1988 | Brogie | |
| 4,944,434 A * | 7/1990 | Hamilton | B60R 9/02 |
| | | | 224/482 |
| D317,742 S * | 6/1991 | Miller | 224/482 |
| 5,029,785 A * | 7/1991 | Besong, Jr. | B60R 9/02 |
| | | | 224/325 |
| 5,084,994 A * | 2/1992 | Elmer | G09F 21/04 |
| | | | 40/591 |
| 5,104,083 A * | 4/1992 | Shannon | B60R 7/10 |
| | | | 211/105.1 |
| D328,240 S * | 7/1992 | Polski | D8/367 |
| 5,344,032 A | 9/1994 | Ramsdell | |
| 5,390,837 A | 2/1995 | Ruffolo | |
| 5,433,416 A * | 7/1995 | Johnson | B65D 23/003 |
| | | | 248/475.1 |
| 5,598,956 A | 2/1997 | Schenberg | |
| 5,676,284 A | 10/1997 | Schenberg | |
| 6,032,842 A | 3/2000 | Brickner | |
| 6,036,071 A * | 3/2000 | Hartmann | B60R 11/00 |
| | | | 224/482 |
| 6,041,717 A | 3/2000 | Kubat | |
| 6,412,675 B1 | 7/2002 | Pope | |
| 6,637,707 B1 | 10/2003 | Gates | |
| 6,769,656 B1 * | 8/2004 | Botkin | A47F 5/0823 |
| | | | 211/57.1 |
| 7,866,492 B2 * | 1/2011 | Walter | A47F 5/0815 |
| | | | 211/103 |
| 8,540,198 B2 * | 9/2013 | Keyvanloo | A47B 96/061 |
| | | | 248/220.21 |
| 8,640,890 B2 * | 2/2014 | Schiller | B65B 67/1227 |
| | | | 211/12 |
| 8,672,309 B2 * | 3/2014 | Birkhauser | B25B 11/007 |
| | | | 269/21 |
| 8,677,626 B2 * | 3/2014 | Adas | B25B 11/007 |
| | | | 29/281.1 |
| 8,811,812 B1 * | 8/2014 | Lawler | G03B 17/561 |
| | | | 224/482 |
| 2002/0152598 A1 * | 10/2002 | Sarh | B21C 37/30 |
| | | | 29/90.01 |
| 2004/0003488 A1 * | 1/2004 | Thompson | B25B 11/007 |
| | | | 29/281.1 |
| 2006/0138292 A1 | 6/2006 | Yang | |
| 2006/0213942 A1 | 9/2006 | Gomez | |
| 2006/0284040 A1 * | 12/2006 | Nixon | A47G 23/0225 |
| | | | 248/311.2 |
| 2007/0090252 A1 | 4/2007 | Chou | |
| 2012/0074083 A1 * | 3/2012 | Geils | A63B 71/0045 |
| | | | 211/85.7 |
| 2014/0263514 A1 * | 9/2014 | Kniepmann | B60R 11/00 |
| | | | 224/559 |
| 2015/0191124 A1 * | 7/2015 | Du | F16M 13/022 |
| | | | 248/205.4 |

* cited by examiner

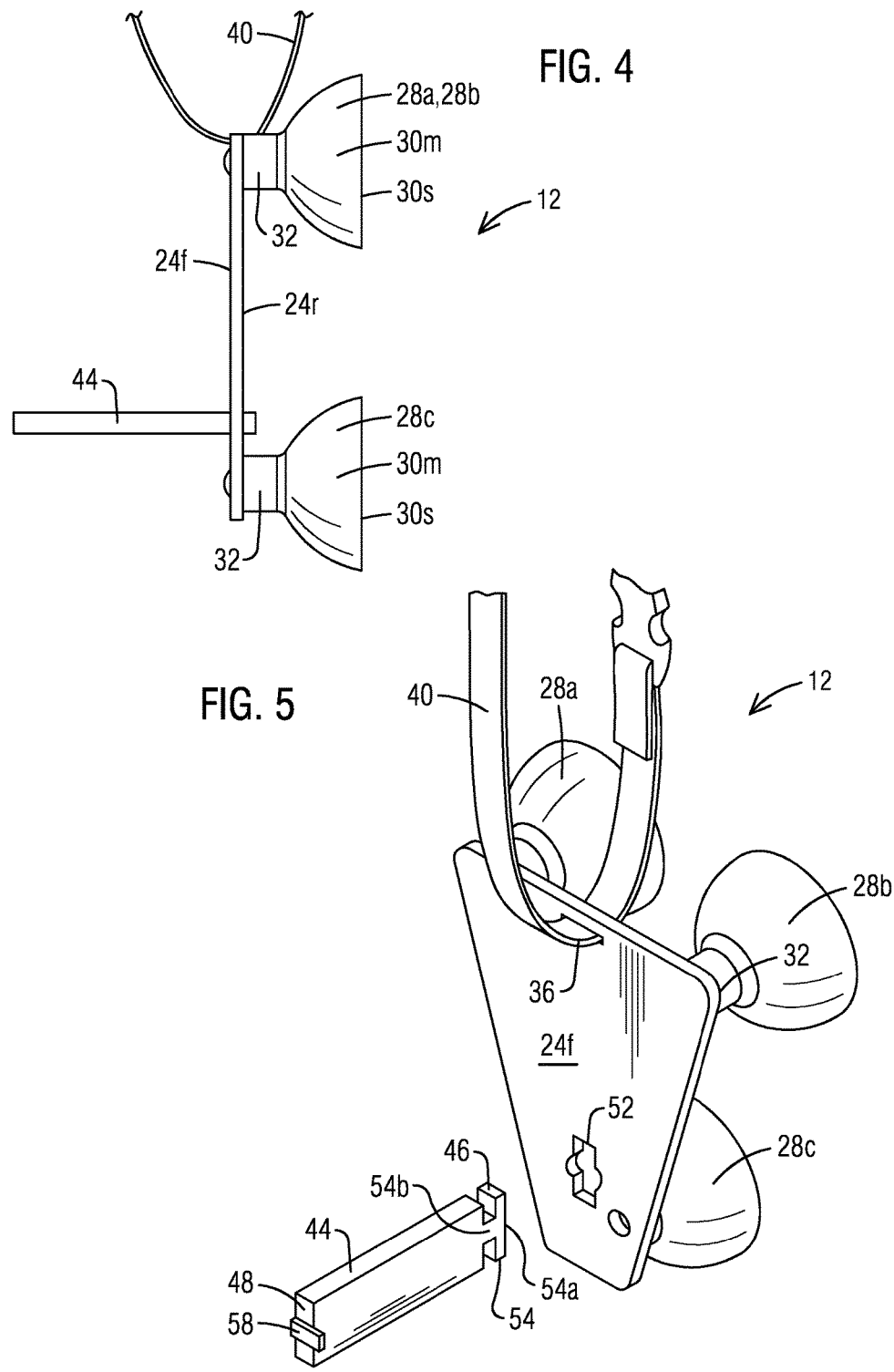

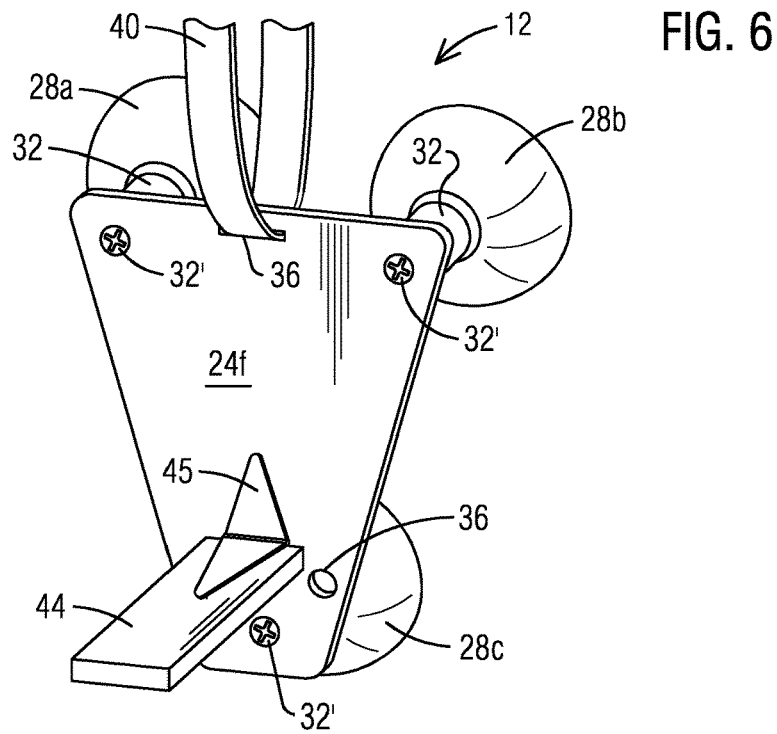
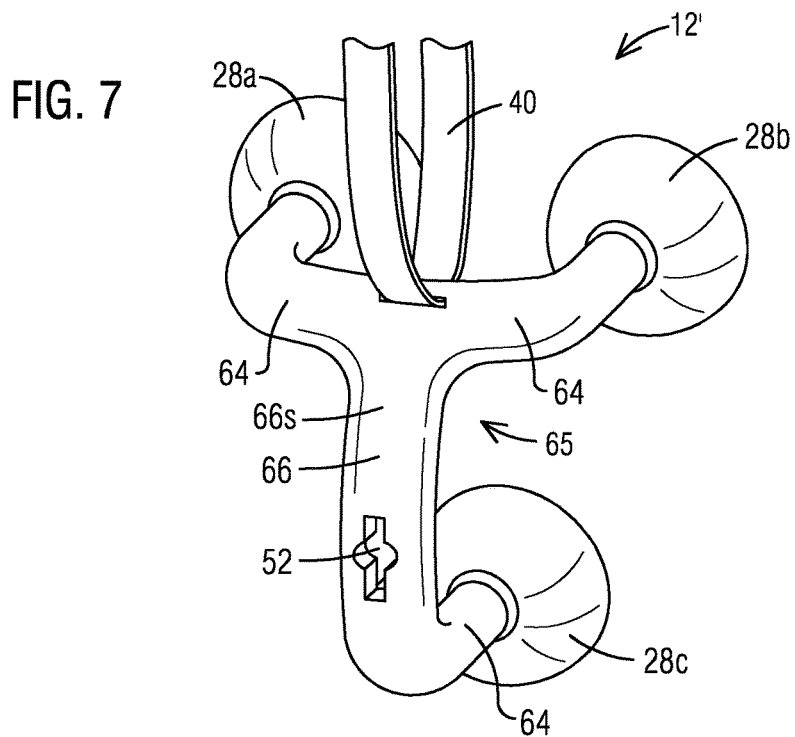

VEHICLE MOUNTABLE CARRIER SYSTEM

CROSS REFERENCE TO RELATED APPLICATIONS

This application is a continuation of U.S. patent application Ser. No. 14/207,406, filed Mar. 12, 2014, which is incorporated herein by reference.

FIELD OF INVENTION

The present invention relates to vehicle mountable rack systems and, more specifically, to removable vehicle mounted rack systems which are easily installed and removed and storable in small vehicle spaces.

BACKGROUND OF THE INVENTION

Conventional rack systems for trucks and other types of vehicles that transport ladders or other long objects are typically top mount systems (e.g., positioned over the roof of the vehicle) or systems attached to the rear of a vehicle (e.g., via a hitch) to carry the load). The difficulties and inconveniences of lifting, securing and transporting long objects like ladders, lengths of wood and pvc piping on an overhead rack system are arise, in part, because it is often necessary to manually raise the objects to roof height and, when employing a rack, there must be a spatial distribution of sufficient attachment points to provide stability to the cargo.

Conventional rack systems for trucks and other types of vehicles that transport ladders or other long objects are typically top mount systems (e.g., positioned over the roof of the vehicle) or systems attached to the rear of a vehicle (e.g., via a hitch) to carry the load). Truck, van, SUV and sedan owners occasionally need to transport lengthy items, but rarely have the capability to do so without securing the item directly to the vehicle, or placing it inside the vehicle itself. Difficulties and inconveniences of lifting, securing and transporting long objects like ladders, lengths of wood and pvc piping on an overhead rack system arise, in part, because it is often necessary to manually lift the objects to roof height. Also, when employing a rack, there must be a spatial distribution of sufficient attachment points to provide stability to the cargo. Typical rack systems, whether aftermarket or factory installed, have narrow cross spans, due in part to relatively short roof lengths. These limit the ability to safely carry many lengthy items. In the case of truck owners, the ability to carry a ladder may require installing overhead rack systems on the truck beds. Ladder racks and other overhead rack systems are expensive, look unattractive, and are relatively permanent. Rack systems may have relatively narrow spans (3-6 feet), in many instances limiting the ability to only carry substantially longer items when the items have internal structural rigidity, e.g., such as ladders. These prior rack systems are not well-suited for carrying long, flexible items, like pvc tubing, crown molding, baseboards, rebar, etc., as these are often sold in 14'-16' lengths. Securing items directly to the vehicle, either without a rack, or by using a narrow span rack, has involved placing the material in contact with the vehicle roof surface. This increases the risk of damaging the automotive paint finish, side mirrors, and other exterior or interior surfaces. Because risks include marring the vehicle interior, the tasks of carrying long flexible materials are often reserved for occasions when the weather is not inclement.

SUMMARY OF THE INVENTION

An exemplary vehicle mountable carrier system is disclosed which is easily deployed to carry long items along the side of a pickup truck, van, SUV, sedan or other vehicle. The system comprises a pair of similar rack assemblies made of aluminum, other metals, high impact plastic, or other sturdy material, and the invention also includes methods for securing the rack to the vehicle. These methods may include use of suction cups or tether straps. The various rack parts may be hinged, riveted, welded, screwed, interlocked, integrally formed or otherwise attached. The carrier system may include two or more racks that each attach to a surface of the vehicle, one rack deployed near a forward-most part of the vehicle, e.g., on or in front of a front-most door; and the other rack deployed near the rear of the vehicle, there being a user adjustable span to fit variable applications.

In one series of embodiments, a carrier system according to the invention includes at least one rack mountable on a vehicle to transport material. The rack includes a frame having front and rear sides. One or more suction cups are attached to the rear side of the frame so that a suction side of each cup faces away from the frame, e.g., for attachment to a surface such as the side of the vehicle. A support bar mates with the frame. In one embodiment, the support bar and the frame include attachment configurations which mate with one another to selectively and securely attach the bar to the front side of the frame with the bar extending in a direction away from the one or more cups. With the rack comprising a plurality of suction cups, the frame may be configured as a plate or may comprise a series of arms or connected braces which extend away from a center position to the suction cups.

The attachment configuration of the frame may include a keyway which extends into or through the frame, e.g., in the form of a slotted opening; and the support bar, also referred to as a rack bar, may include a locking configuration which fits into the keyway to effect securement of the bar at an angle with respect to the frame with the bar extending away from the frame. In one example, the angle may be ninety degrees, but smaller angles are contemplated. More generally, the carrier system may comprise a plurality of racks according to any of multiple embodiments.

Each rack may comprise three spaced-apart suction cups. Each suction cup may be connected to the frame via a tubular post or other stand-off positioned between the frame and the back side of the suction cup, i.e., the opposite the suction side. The afore-mentioned locking configuration may include on the frame a rectangular-like slot extending into or through the frame. The slot may include a circular portion within which a portion of the bar can rotate to place the bar in a secure, locked position or in a position from which the bar can be removed from the frame slot. On the rack bar, the locking configuration may be formed about a first end of the bar and a stop may be formed along an upper surface about a second end of the bar.

While carrier systems according to the invention may be deployed on either side of a vehicle, it is intended for deployment to be only on the passenger side of the vehicle. A carrier system may typically comprise at least two similar racks that each mount on any smooth metal or glass surface of the vehicle. In the disclosed embodiments each rack is a single unit comprising 3 main components: 1) a base plate, 2) one or more suction cups, and 3) a horizontal rack bar.

BRIEF DESCRIPTION OF THE DRAWINGS

FIG. 4 provides a side elevation view of the rack shown in FIG. 2;

FIG. 5 illustrates components of the rack shown in FIGS. 2-4 in spaced apart relation prior to assembly; and FIG. 6 illustrates components of the carrier system according to an alternate embodiment which employs a hinge.

FIG. 7 is a front view of a rack which, according to another embodiment, comprises a frame formed of brackets in lieu of a flat plate.

Like reference numbers are used throughout the figures to denote like components. Numerous components are illustrated schematically, it being understood that various details, connections and components of an apparent nature may not be shown in order to emphasize features of the invention. Various features shown in the figures may not be shown to scale in order to emphasize features of the invention.

DETAILED DESCRIPTION OF THE INVENTION

Before describing in detail exemplary methods, systems and components according to embodiments of the invention, it is noted that the present invention resides primarily in a novel and non-obvious combination of components and method steps. So as to not obscure the disclosure with details that will be readily apparent to those skilled in the art, certain conventional components and steps have been omitted or presented with lesser detail, while the drawings and the specification describe in greater detail elements and steps pertinent to understanding and practicing the invention. Further, the following embodiments do not define limits as to structure or method according to the invention, but provide examples which include features that are permissive rather than mandatory and illustrative rather than exhaustive.

Figure 1:
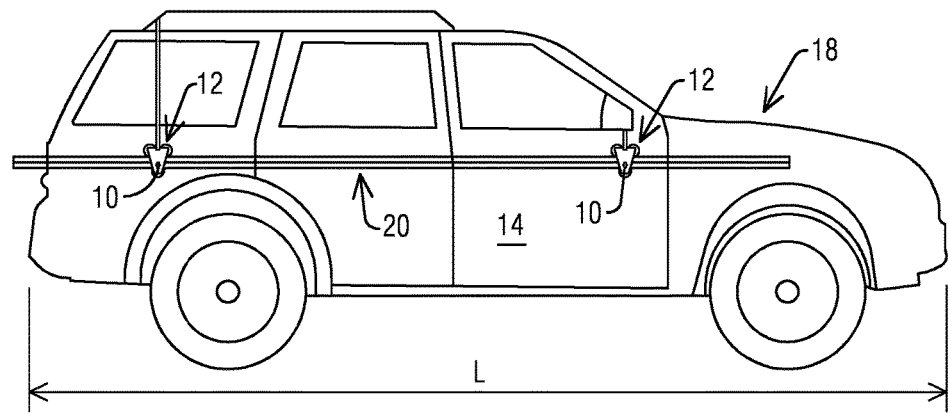
FIG. 1 is a perspective view of a side a vehicle on which a carrier system according to the invention is installed.

With reference to FIG. 1 there is shown a carrier system 10 according to an embodiment of the invention. The system 10 comprises one or more hangers, referred to herein as racks 12. Each rack 12 is shown mounted along a common side 14 of a vehicle 18. The vehicle is shown positioned above a horizontal ground plane, G with two mounted racks to enable transporting lengths of material 20. The material may span a portion of, all of or more than the length, L, of the vehicle 18. The material 20 may be any of a variety of items, including items typically used in home projects, light construction, and sporting activities (e.g., pipes, molding or other types of wood or plastic trim, wood studs, rods, fishing gear, etc.). Generally, the system is suitable for transporting items which are relatively long and narrow, but is not so limited in versatility. Further, the racks can also be mounted on other surfaces of the vehicle, including the rear side, the front side, the roof and the hood, although mounting on the vehicle side 14 may be preferred in most applications.

As illustrated in this description, embodiments of the invention are portable, compact, and easy to transport and deploy. System components can be stored in a vehicle when not in use. Additionally, loading material on the carrier system and unloading the material can be relatively quick and simple. For example, the material or other cargo can be attached to and carried by the vehicle at approximately the waist or chest level of a typical person. This is to be contrasted with placement of the material 20 over the roof line of a vehicle, as is common with many carriers. Further, the system can be deployed with sufficient distance between a pair of the racks 12 to support the ends of long flexible materials like pvc pipe, baseboards, crown molding, etc., which are often sold in 10',12' and 16' lengths. Still further, the system can be used to carry long lengths of materials alongside the vehicle without allowing the material to touch and potentially damage the surface of the vehicle side 14. Moreover, the system can be mounted on the vehicle 18 by one person in less than a few minutes.

Figure 2A:
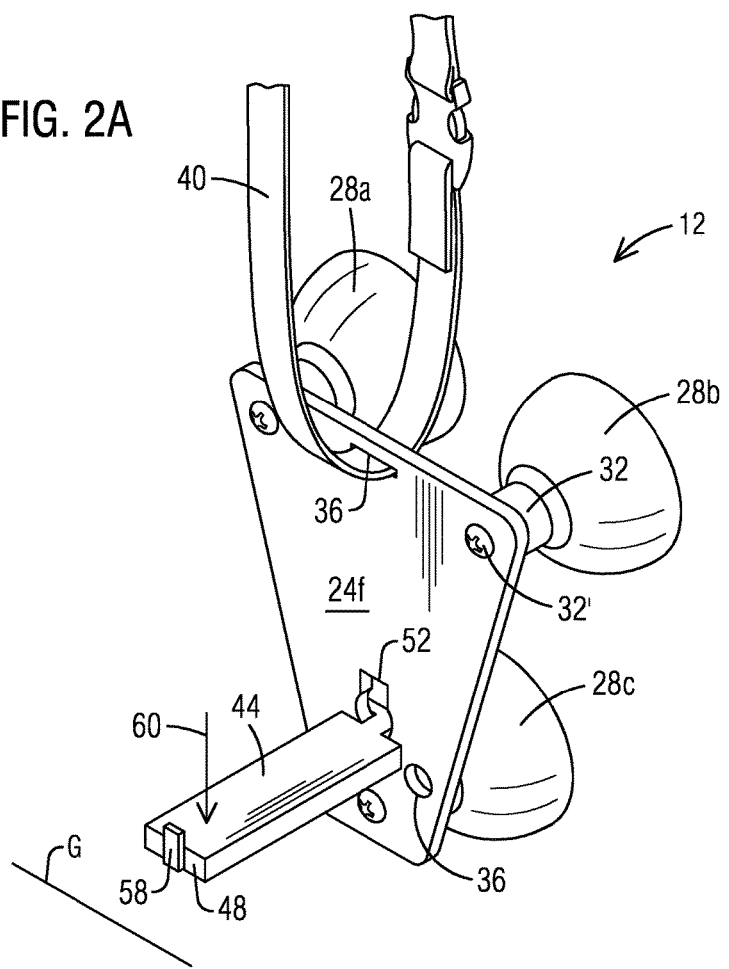
FIG. 2A is a perspective view illustrating the front side of a rack or hanger shown in FIG. 1.
Figure 2B:
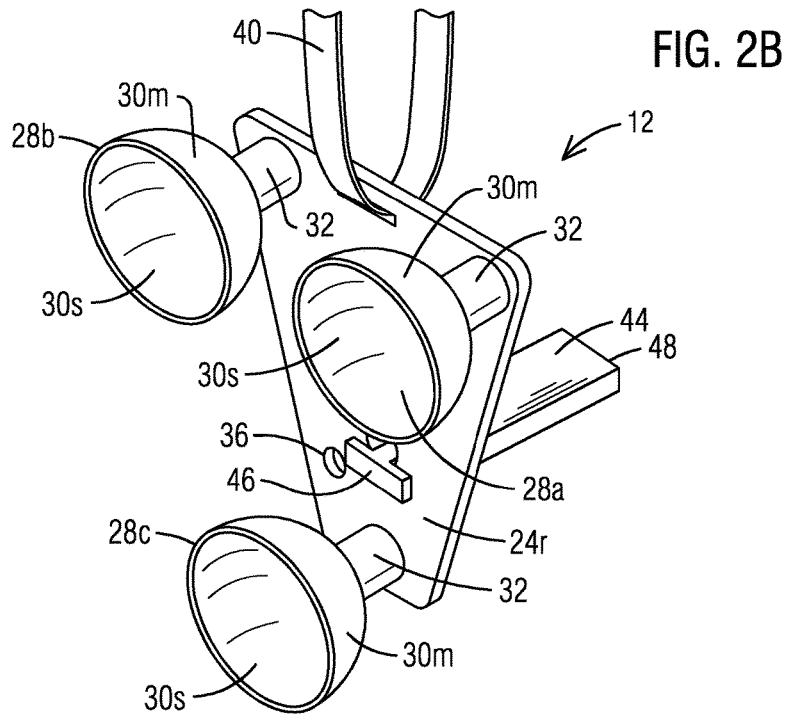
FIG. 2B is a perspective view illustrating the rear side of a rack or hanger shown in FIG. 1.
Figure 3:
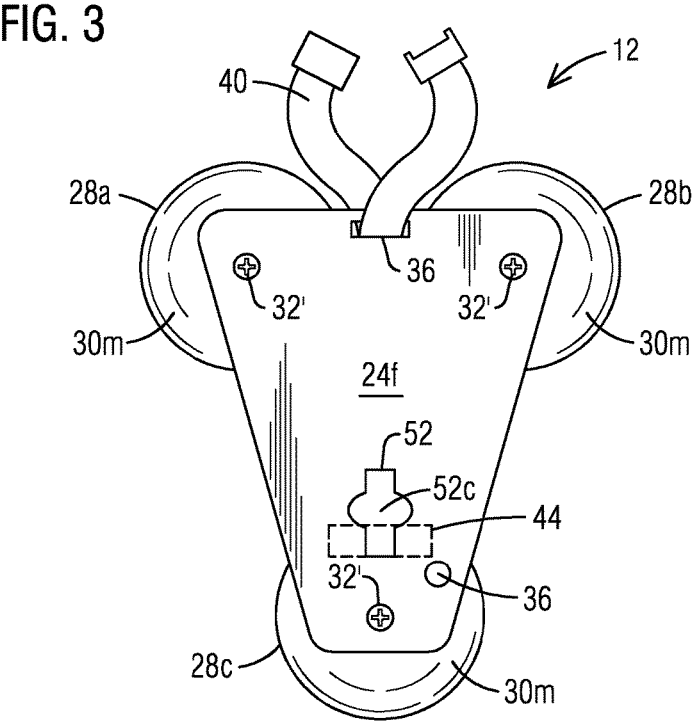
FIG. 3 is a front view of the rack shown in FIG. 2.

FIGS. 2A and 2B are front and rear perspective views of a rack 12 as would be deployed when mounted on the vehicle side 14. FIG. 3 provides a front elevation view of the rack 12. As can be seen in the figures, the illustrated embodiment of the rack comprises a plate 24 having a front side 24$f$ shown in FIGS. 2A and 3, and a rear side 24$r$, shown in FIG. 2B, to which three suction cups 28$a$, 28$b$ and 28$c$ are mounted in a spaced-apart triangular-like configuration. The suction cups may be made of rubber or other pliant material (e.g., a plastic). The cups 28$a$ and 28$b$ are positioned along a horizontal line and above the cup 28$c$ relative to the ground plane, G. Each cup includes first and second opposing sides 30$s$ and 30$m$. The side 30$s$ is an open suction side which faces away from the plate 24 for contact with a surface to which the cup is to be attached. The side 30$m$ is a rear side which faces the plate for attachment thereto through a stand-off 32 in the form of a tubular shaped mounting post.

FIG. 4 provides a side elevation view of the rack 12 taken along an edge of the plate 24 to illustrate the stand-offs 32 which space the cups 28$a$, 28$b$ and 28$c$ away from the plate 24. Each suction cup 28$a$, 28$b$ and 28$c$ is connected to the rear side 24$r$ of the plate with a conventional fastener that extends from a point of securement within the cup and into or through the plate 24. For example, to secure each cup to the plate 24, a machine screw 32 may pass through an aperture in the plate, through a stand-off 32 and into the rear side 30$m$ of a cup where it is threaded into a nut (not shown) that is secured within the cup.

The plate 24 may be a flat plate of arbitrary shape and of sufficient height relative to the ground plane and sufficient width, in a direction parallel to the ground plane, to accommodate an array of suction cups which provide both vertical and horizontal stability to the mounted rack 12. Although three cups are illustrated, the number of suction cups attached to each plate 24 is a design choice which depends, in part, on the load to be carried and conditions such as the vehicle speed during transport and the stability of attachment for each cup.

The base plate may be made of aluminum, other metal, plastic or another sturdy material. Additionally, the plate 24 may have holes or slots which serve as attachment points for anchor ends of, for example, bungee cords or other means of securing loads to each rack 12. Appropriate dimensions for the plate 24 are approximately 7 inches in height by 5½ inches in maximum width. The plate thickness may be on the order of ¼ inch.

The illustrated stand-offs 32, in the form of hollow, cylindrically shaped posts, each extend away from the rear side 24$r$ of the plate to provide necessary clearance from the vehicle body, e.g., to avoid interference due to contours in the shape of the vehicle side 14. In other embodiments he stand-offs 32 may be attached to the plate 24 by weld joints, other types of fasteners, or may be integrally formed with the plate 24 (e.g., with injection molding manufacture to create plastic or composites shapes). Nominal dimensions of cylindrically shaped posts which serve as stand-offs are one inch in diameter and one inch in length.

The plate 24 may also include one or more additional holes or slots 36 which each serve as an additional attachment point for a tether 40 that provides securement to the vehicle in addition to the suction cups. Each tether may be a conventional strap of suitable width, length and strength, may be constructed of nylon or other flexible synthetic or natural material commonly described as webbing/strapping. A tether 40 may comprise a buckle system for tightening and securing the tether to a mounting point on the vehicle. In this regard, a tether may be threaded through or around any attachment point on the vehicle (e.g. OEM attachment rings in a pickup truck bed or a roof rack on an SUV). Exemplary tether dimensions are 0.75 inch in width, and varied length, e.g., two to six feet.

The suction cups 28*a*, 28*b* and 28*c* may be any of a variety of suction cup or vacuum cup designs which readily adhere to the vehicle side 14 or a vehicle window. The suction cups may be of commercial grade to assure provision of sufficient suction to remain stably attached to the vehicle side under specified load conditions. Suitable suction cup dimensions are approximately 3 inches in diameter along the open suction side 30*s* and 1.5 inches in height.

A rack bar 44 extends from the plate 24 in a direction away from the suction cups to provide a support to carry and secure the material 20. In the embodiment illustrated in FIGS. 2 through 6, the rack bar 44 is easily attachable to and detachable from the plate 24 when deploying the system 10. It can be readily removed from the plate 24 to improve compactness of the system for storage purposes. In another embodiment shown in FIG. 6, a rack bar 44' and the plate 24 form a foldable assembly where the bar 44' may be attached to the plate 24 with a hinge 45 so it can swing away from the plate to support the load of the material 20 when the system is deployed (e.g., to extend in a direction which is ninety degrees away from the plane in which the front side 24*f* of the flat plate 24 resides). The hinge 45 includes a stop (not shown) which may be an angle bracket positioned along a bottom surface of the rack bar at the first end 46. The stop limits the range of the angle to which the hinge opens to provide a desired angle between the rack bar 44' and the plate 24. The hinged bar 44' can also be swung about the hinge angle to rest against the plate when the carrier system is being stored. Although not illustrated, for these and other embodiments, when the carrier system is deployed, the rack bar may extend to less than a ninety degree angle relative to the plate 24, i.e., to provide a modest vertical incline of the rack bar relative to the plate. This can impart a beneficial positive slope to the rack bar, as a function of distance along a direction away from the plate. In still other embodiments, the rack bar may be permanently affixed to the plate 24 with no freedom to rotate or change the angle of the bar 44 relative to the plate 24.

For the embodiment illustrated in FIGS. 3 and 4, the rack bar 44 and the plate 24 are shown in a deployed configuration of the system 10 where the plate is in a vertical position and the rack bar is approximately in a horizontal position with respect to the ground plane. The rack bar 44 is of a generally rectangular shape, having a nominal height (i.e., shown in a vertical direction with respect to the ground plane) of about 1¼ inches, a width (i.e., along a horizontal direction) of about ½ inch and a length, measured between first and second opposing ends 46, 48, of 5½ inches. The rack bar includes features formed about the first and second opposing ends 46, 48. See FIG. 5. To effect selectable securement of the rack bar 44 to the plate, the plate 24 includes a keyway 52 sized to accept a mating feature 54 formed about the first end 46 of the rack bar 44. The exemplary keyway 52 is a combination of a rectangular shaped slot, which extends through the plate 24, and a circular cutout 52*c* which widens a center region of the slot to permit rotation of the mating feature 54 when placed in the keyway 52. The opening provided by the keyway 52 extends a sufficient length and width in the vertical and horizontal directions to receive the nominal dimensions of the rack bar end 46.

In the illustrated embodiment the mating feature 54 includes keyway cutouts 56 which leave a rectangular segment 54*a* at the end 46 suitable for insertion through the keyway. As shown in the figures, the segment 54*a* may be the full nominal height and width of the rack bar. The keyway cutouts 56 leave a small, recessed rectangular segment 54*b* in the center region of the rack bar, i.e., which does not extend the full height of the rack bar. The small segment 54*b* connects the segment 54*a* to the rest of the rack bar 44. When the rectangular segment 54*a* at the end 46 is inserted through the keyway 52, the smaller rectangular segment 54*b*, having nominal height and width dimensions of ½ inch, resides in the slot. The diameter of the circular cutout 52*c*, enables rotation of the rack bar when the larger rectangular segment 45*a* is extended through the keyway to the rear side 24*r* of the plate. For example, the cutout 52*a* may have a ¾ inch diameter. Once the rack bar is rotated into a desired rotational position, it is slid downward in the keyway to secure the rack bar in a lower rectangular portion of the keyway slot, i.e., below the circular cutout.

A second feature of the rack bar 44 is provision of a stop 58 at the second end 48, along an upper surface 60 thereof. The stop impedes movement of the material off the end 48 when being placed on the surface 60. The combination of the stop 58 and any slope provided to the rack bar also help keep the material in place during transport. To impart a slope to the installed rack bar, relative to the plate 44, the mating feature may be formed at an angle with respect to the vertical orientation of sides of the cutout.

The rack bar 44 may be made of aluminum, other metal, a plastic or a composite material. Further, the rack bar may have holes in the bottom or sides to provide anchor points for rope, straps, bungee cords or other means to secure the load to the rack. An exemplary rack bar is 5½ inches long, ½ inch thick and 1¼ inches wide.

According to still another embodiment, FIG. 7 is a front view of a rack 12' which, in lieu of a frame formed in the shape of the flat plate 24, comprises an assembly 65 of interconnected brackets or arms 64 which extend in different directions from a center position 66, with each of three suction cups 28*a*, 28*b* and 28*c* connected to an arm 64. The brackets or arms 64 may be formed of injection molded plastic. The center position 66 includes a surface 66*s* along which the keyway 52 or other mating feature may be formed or positioned to interface with a mating feature of the rack bar.

While this written description and the drawings enable one of ordinary skill to make and use what is believed to be the best mode for practicing the invention, those of ordinary skill will understand and appreciate the existence of variations, combinations, and equivalents of the disclosed embodiments, methods, and examples described herein. For example, a carrier system may utilize an integrated unit of cup, post and plate fabricated in an injection molding or machining process. The integrated unit may comprise vacuum cups of the type which apply suction via a lever on the cup. An advantage of using vacuum cups is that these types of cups are more capable of lifting heavy objects like glass or pulling dents. Such cups may be produced as part of an integrated assembly to make a "handle-type" device, and are manufactured by companies such as Tooluxe. In such a design, one or more vacuum cups would be designed into a fully integrated unit where the cups, post and plate are formed together. The invention is therefore not limited by the described embodiments, but only by the scope and spirit of the claims which now follow.

The claimed invention is:

1. A carrier system for transporting a load of material by mounting the material along an exterior surface of a vehicle body to support the load on one or more support bars, the system suitable for attachment along contours in the shape of the vehicle body, the carrier system including a first rack to support a portion of the load, the first rack comprising:
    a frame having front and rear sides and suitable for attachment of suction cups along contours in the shape of the exterior vehicle body surface;
    at least first, second and third suction cups each attached to the rear side of the frame via an attachment means so that a suction side of each cup faces away from the frame for attachment to the exterior vehicle surface,
    the frame comprising at least first, second and third arms connected to one another via a central body portion, a first portion of each arm extending in a different direction away from a first position along the central body portion and a second portion of each arm extending in a direction to effect suction attachment of one of the suction cups along the exterior vehicle body surface, the frame including:
    an attachment opening extending into the central body portion to receive and connect a support bar to the frame with the support bar extending in a direction away from the frame to support the load.

2. The carrier system of claim 1, further including a support bar having first and second opposing ends, the first end being an attachment end insertable into the attachment opening in the frame to effect mounting of the support bar so that the support bar extends in a direction away from the frame where the support bar includes a surface shape which, when the attachment end is inserted into the attachment opening, adjoins the frame to support the load.

3. The carrier system of claim 1 where the attachment opening includes a keyway feature formed through the front side of the frame to interface with a mating feature of the support bar.

4. A carrier system for transporting a load of material by mounting the material along an exterior surface of a vehicle body to support the load on one or more support bars, the system suitable for attachment along contours in the shape of the vehicle body, the carrier system including a first rack to support a portion of the load, the first rack comprising:
    a frame having front and rear sides and suitable for attachment of suction cups along contours in the shape of the exterior vehicle body surface;
    at least first, second and third suction cups each attached to the rear side of the frame so that a suction side of each cup faces away from the frame for attachment to the exterior vehicle surface,
    the frame comprising at least first, second and third arms connected to one another via a central body portion, a first portion of each arm extending in a different direction away from a first position along the central body portion and a second portion of each arm extending in a direction to effect suction attachment of one of the suction cups along the exterior vehicle body surface, where the portion of each arm which extends in a direction to effect suction attachment of one of the suction cups provides the function of a standoff that extends away from the front side of the frame to provide clearance along the vehicle body to help avoid interference due to contours in the shape of the vehicle body, the frame including an attachment opening extending into the central body portion to receive and connect a support bar to the frame with the support bar extending in a direction away from the frame to support the load.

5. The carrier system of claim 1, where the attachment opening is along the front side of the frame and is configured to selectively connect the frame to a support bar and securely attach the bar to the front side of the frame so that the support bar extends in a direction away from the frame.

6. The carrier system of claim 5 where the attachment feature includes a mating feature formed through the front side of the frame to interface with a mating feature of the support bar.

7. The carrier system of claim 1 where:
    the frame includes an upper frame portion comprising the first and second arms with the first and second suction cups attached thereto and a lower frame portion comprising the third arm with the third suction cup attached thereto; and
    the attachment opening is located at a second position along the central body portion or along the third arm which second position is closer to the third suction cup than to the first or second suction cup.

8. The carrier system of claim 7 where the upper frame portion includes a first hole for receiving tether material therethrough to tether the frame from a portion of the vehicle above the frame with the tether material.

9. A carrier system for transporting a load of material by mounting the material along an exterior surface of a vehicle body to support the load on one or more support bars, the system suitable for attachment along contours in the shape of the vehicle body, the carrier system including a first rack to support a portion of the load, the first rack comprising:
    a frame having front and rear sides and suitable for attachment of suction cups along contours in the shape of the exterior vehicle body surface;
    at least first, second and third suction cups each attached to the rear side of the frame so that a suction side of each cup faces away from the frame for attachment to the exterior vehicle surface,
    the frame comprising at least first, second and third arms connected to one another via a central body portion, and where the frame arms are integrally formed as a unitary piece, a first portion of each arm extending in a different direction away from a first position along the central body portion and a second portion of each arm extending in a direction to effect suction attachment of one of the suction cups along the exterior vehicle body surface, the frame including an attachment opening extending into the central body portion to receive and connect a support bar to the frame with the support bar extending in a direction away from the frame to support the load.

10. The carrier system of claim 9 where:
    the frame includes an upper frame portion comprising the first and second arms with the first and second suction cups attached thereto and a lower frame portion comprising the third arm with the third suction cup attached thereto; and the attachment opening is located at a second position along the central body portion or along the third arm which second position is closer to the third suction cup than to the first or second suction cup.

11. The carrier system of claim 9 further including the support bar.

12. The carrier system of claim 4 further including a support bar having an attachment end insertable into the attachment opening in the frame to effect mounting of the support bar to extend in a direction away from the frame, the mounted support bar having a flat surface which adjoins the frame to support the load.

13. The carrier system of claim 12 where the portions of the arms which each extend in a direction to effect suction attachment of one of the suction cups all extend in a common direction.

14. The carrier system of claim 12 where:
the frame includes an upper frame portion comprising the first and second arms with the first and second suction cups attached thereto and a lower frame portion comprising the third arm with the third suction cup attached thereto; and
the attachment opening is located at a second position along the central body portion or along the third arm which second position is closer to the third suction cup than to the first or second suction cup.

15. The carrier system of claim 12 further including the support bar.

\* \* \* \* \*